US012229444B2

(12) United States Patent
De Angelis et al.

(10) Patent No.: US 12,229,444 B2
(45) Date of Patent: Feb. 18, 2025

(54) COMMAND SCHEDULING FOR A MEMORY SYSTEM

(71) Applicant: Micron Technology, Inc., Boise, ID (US)

(72) Inventors: Domenico Francesco De Angelis, Sant'Anastasia (IT); Crescenzo Attanasio, Acerra (IT); Carminantonio Manganelli, San Giorgio del Sannio (IT)

(73) Assignee: Micron Technology, Inc., Boise, ID (US)

( * ) Notice: Subject to any disclaimer, the term of this patent is extended or adjusted under 35 U.S.C. 154(b) by 93 days.

(21) Appl. No.: 17/892,960

(22) Filed: Aug. 22, 2022

(65) Prior Publication Data

US 2024/0061615 A1 Feb. 22, 2024

(51) Int. Cl.
*G06F 3/06* (2006.01)
*G06F 13/16* (2006.01)

(52) U.S. Cl.
CPC .......... *G06F 3/0659* (2013.01); *G06F 3/0614* (2013.01); *G06F 3/0625* (2013.01); *G06F 3/0673* (2013.01); *G06F 13/1668* (2013.01)

(58) Field of Classification Search
None
See application file for complete search history.

(56) References Cited

U.S. PATENT DOCUMENTS

| 8,433,937 B1* | 4/2013 | Wheelock | G11B 19/00 713/320 |
|---|---|---|---|
| 10,387,078 B1* | 8/2019 | Benisty | G06F 3/0659 |
| 2010/0262721 A1* | 10/2010 | Asnaashari | G06F 3/0659 710/22 |
| 2014/0129759 A1* | 5/2014 | Sauber | G06F 3/0658 711/E12.008 |
| 2019/0146695 A1* | 5/2019 | Kim | G06F 3/0625 713/330 |
| 2019/0391761 A1* | 12/2019 | Brief | G06F 3/0656 |

* cited by examiner

*Primary Examiner* — Nathan Sadler
(74) *Attorney, Agent, or Firm* — Holland & Hart LLP

(57) ABSTRACT

Methods, systems, and devices for command scheduling for a memory system are described. A memory system may be configured to analyze a received command during an initialization procedure for one or more components. In some examples, the memory system may initialize an interface and one or more processing elements as part of an initialization procedure upon transitioning from a first power mode to a second power mode. Accordingly, the command may be analyzed while the processing elements are being initialized such that, upon the processing elements being fully initialized, the command may be processed (e.g., executed).

22 Claims, 7 Drawing Sheets

COMMAND SCHEDULING FOR A MEMORY SYSTEM

FIELD OF TECHNOLOGY

The following relates to one or more systems for memory, including command scheduling for a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Memory systems may include one or more components which operate in accordance with various power modes to support power savings. For example, some components may always (or nearly always) operate in a powered-on state (e.g., an always on (AON) state), while other components may operate in a powered-on or a powered-off (e.g., a powered-down) state (e.g., a sometimes on (SON) state) regardless of the power mode of the memory system. Accordingly, when a memory system powers on (e.g., powers up, exits a low power or a hibernate mode), components in the SON state may need to power up (e.g., initialize) before a command is received and executed. However, the duration needed for the components in the SON state to power up before receiving and processing the command may add undesirable latency and otherwise decrease the overall performance of the memory system. Accordingly, a memory system configured to reduce or mitigate latency when transitioning power modes may be desirable.

A memory system configured to reduce or mitigate latency when transitioning power modes is described herein. In accordance with examples as disclosed herein, a memory system may be configured to analyze a received command during an initialization procedure of one or more components such that, when the components are initialized, the command may be processed (e.g., executed). In some examples, the memory system may initialize an interface (e.g., a host interface (HIF)) and one or more processing components (e.g., a first processing element, a second processing element) upon the memory system transitioning power modes (e.g., powering on, transitioning from a first power mode to a second power mode). In such examples, the memory system may, during the initialization procedure, analyze the command using a component in an AON state such that the command may be processed after all (or most) of the components are initialized. By analyzing the command during this duration (e.g., the duration when one or more SOF components are being initialized), the memory system may reduce or mitigate latency that would otherwise be incurred by receiving and analyzing the command once the components are fully initialized. Accordingly, the overall performance of the memory system may be improved.

Figure 1:
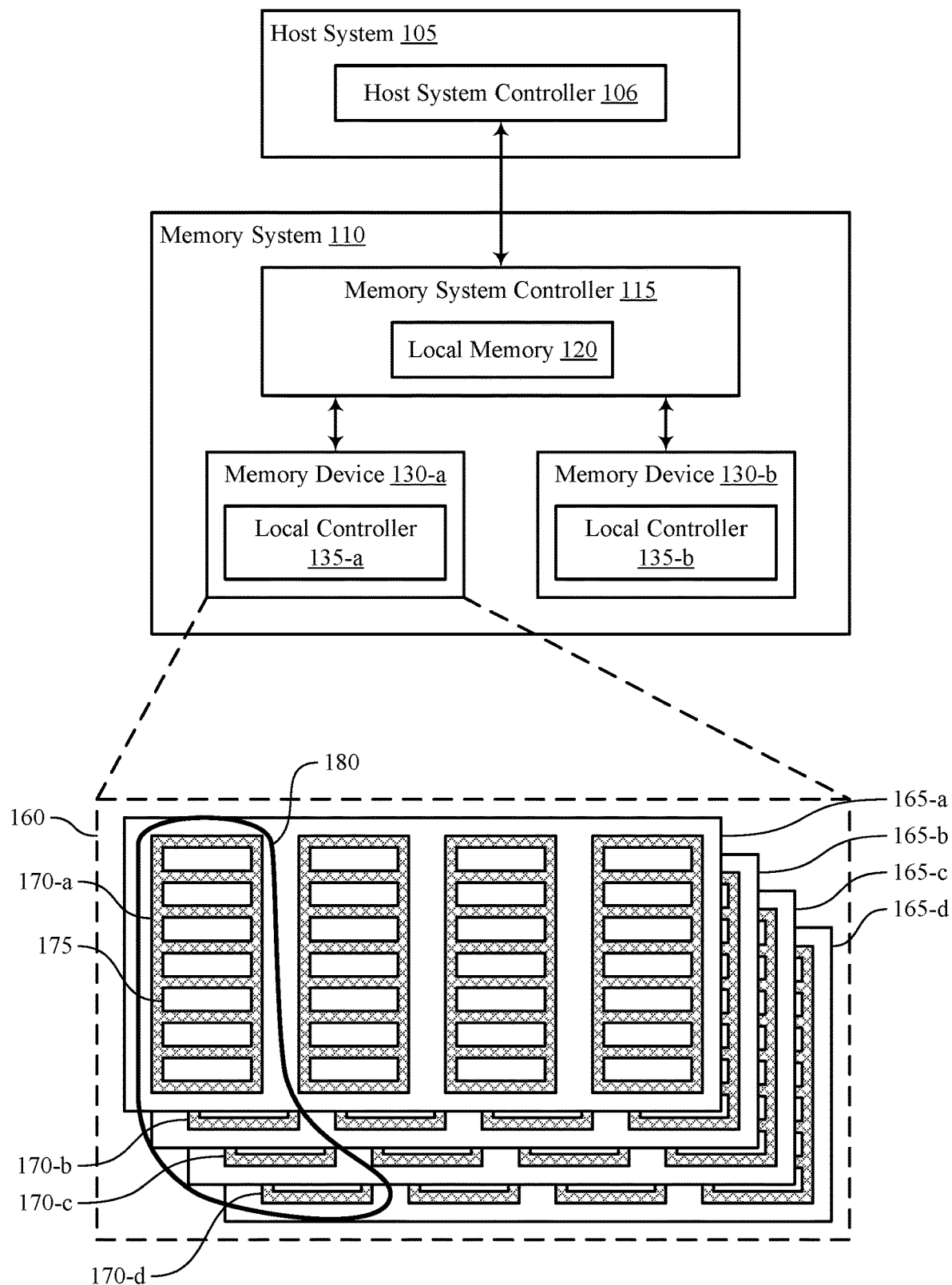
FIG. 1 illustrates an example of a system that supports command scheduling for a memory system in accordance with examples as disclosed herein.
Figure 2:
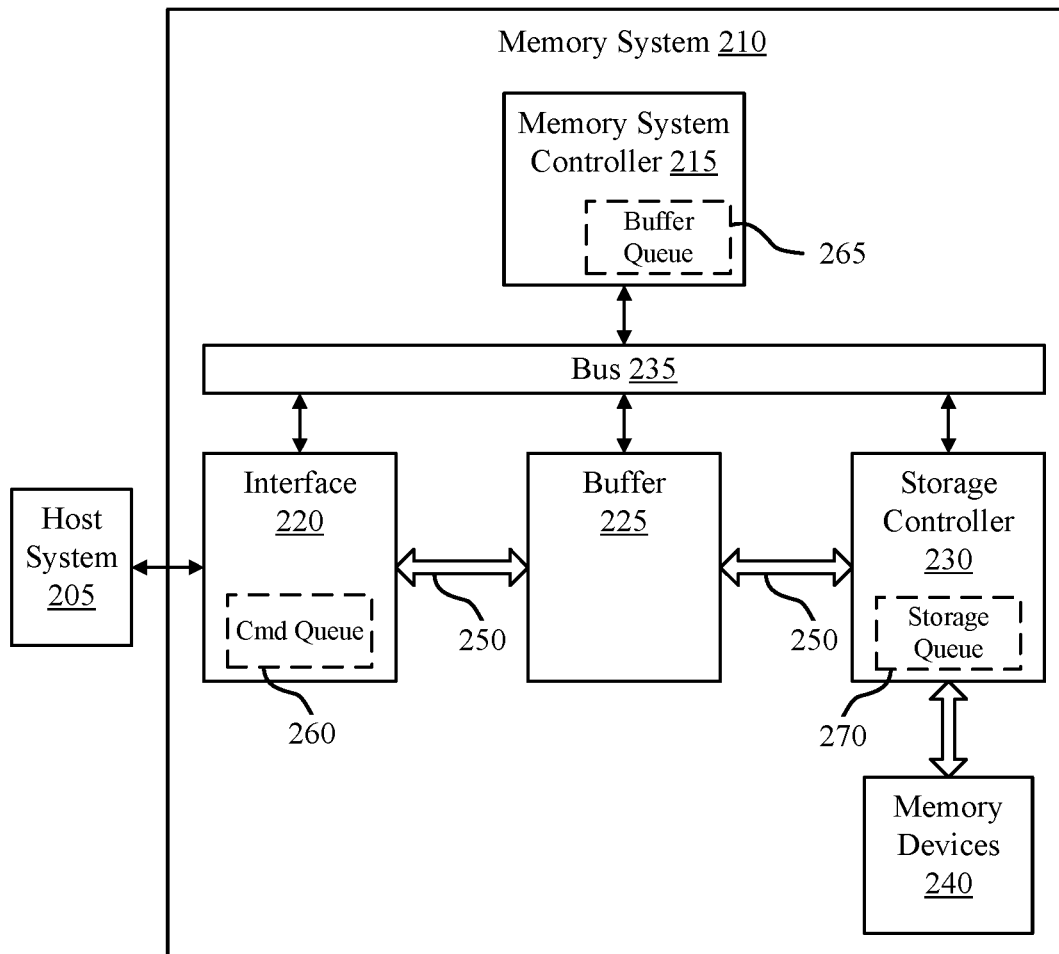
FIG. 2 illustrates an example of a system that supports command scheduling for a memory system in accordance with examples as disclosed herein.
Figure 3:
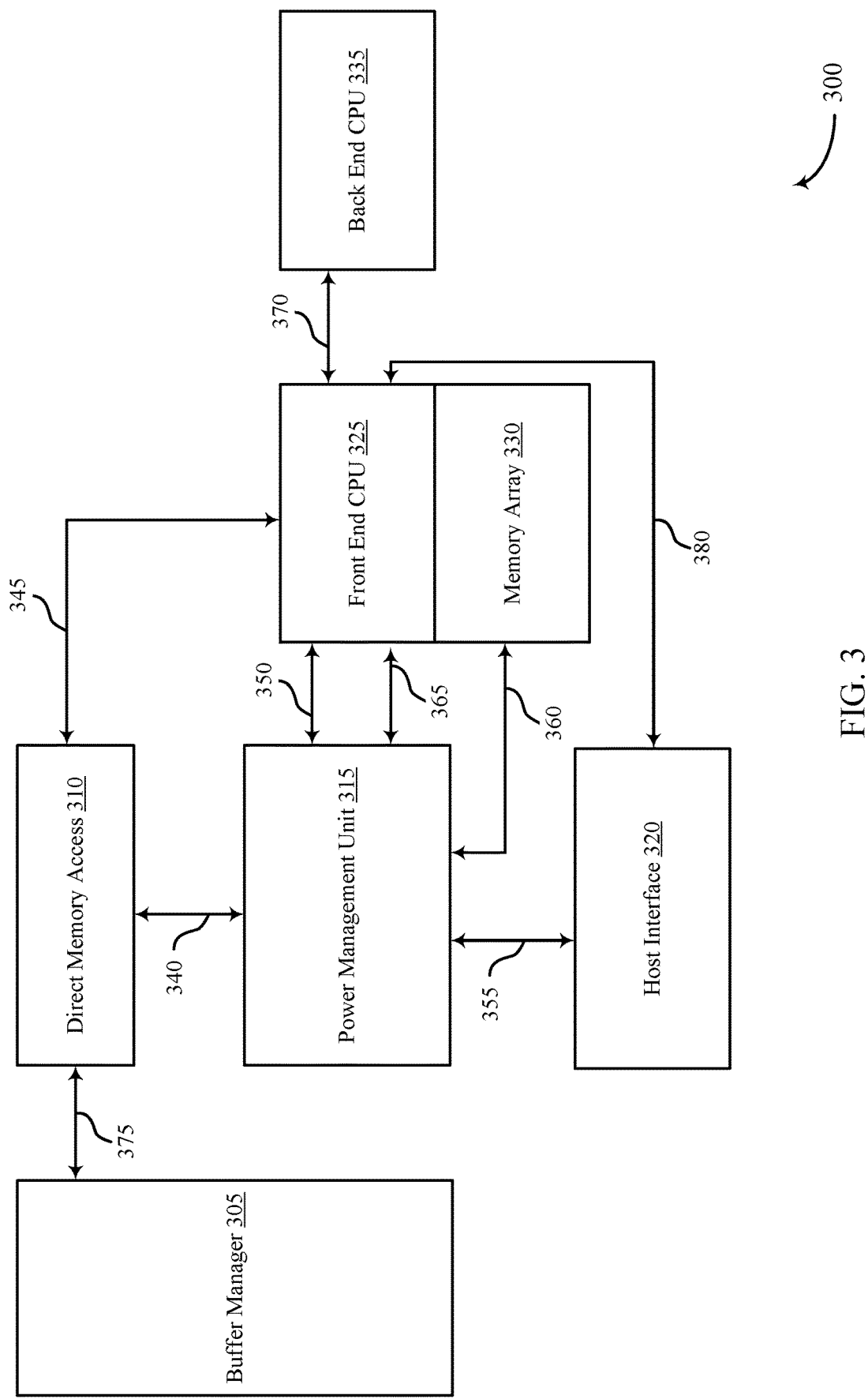
FIG. 3 illustrates an example of a system that supports command scheduling for a memory system in accordance with examples as disclosed herein.

Features of the disclosure are initially described in the context of systems with reference to FIGS. 1 through 3. Features of the disclosure are described in the context of timing diagrams and process flow diagrams with reference to FIGS. 4 through 5. These and other features of the disclosure are further illustrated by and described in the context of an apparatus diagram and flowchart that relate to command scheduling for a memory system with reference to FIGS. 6 through 7.

FIG. 1 illustrates an example of a system 100 that supports command scheduling for a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as ti-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support command scheduling for a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may be configured to analyze a received command during an initialization procedure for one or more components such that, when the components are initialized, the command may be processed (e.g., executed). In some examples, the memory system 110 may initialize an interface (e.g., a host interface (HIF)) and one or more processing components (e.g., a first processing element, a second processing element) upon the memory system 110 transitioning power modes (e.g., powering on, transitioning from a first power mode to a second power mode). For example, the interface may be coupled with the host system 105 and configured to receive commands from the host system 105. Additionally, or alternatively, the memory system controller 115 (or another component of the memory system 110) may include the first processing element, the second processing element, or both.

During the initialization procedure, the memory system 110 may analyze a received command using a component in an always on state (e.g., an AON state) such that the command may be processed after all (or most) of the components are initialized. By analyzing the command during this duration (e.g., the duration when one or more components are being initialized), the memory system 110 may reduce or mitigate latency that would otherwise be incurred by analyzing the command once the components are fully initialized. Accordingly, the overall performance of the memory system 110 may be improved.

FIG. 2 illustrates an example of a system 200 that supports command scheduling for a memory system in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

The memory system 210 may be configured to analyze a received command during an initialization procedure for one or more components such that, when the components are initialized, the command may be processed (e.g., executed). In some examples, the memory system 210 may initialize an interface 220 (e.g., a host interface (HIF)) and one or more processing components (e.g., a first processing element, a second processing element) upon the memory system 210 transitioning power modes (e.g., powering on, transitioning from a first power mode to a second power mode). For example, the memory system controller 215 (or another component of the memory system 210) may include the first processing element, the second processing element, or both.

During the initialization procedure, the memory system 210 may analyze a received command using a component in an always on state (e.g., an AON state) such that the command may be processed after all (or most) of the components are initialized. By analyzing the command during this duration (e.g., the duration when one or more components are being initialized), the memory system 210 may reduce or mitigate latency that would otherwise be incurred by analyzing the command once the components are fully initialized. Accordingly, the overall performance of the memory system 210 may be improved.

FIG. 3 illustrates an example of a system 300 that supports command scheduling for a memory system in accordance with examples as disclosed herein. The system 300 may be an example of aspects of the system 100 or the system 200 as described with reference to FIGS. 1 and 2. For example, the system 300 may include a buffer manager 305, a direct memory access 310, a power management unit 315, a front end CPU 325, and a back end CPU 335. The operations between components of the system 300 may be implemented via various links (e.g., a link 340, a link 345, a link 350, a link 355, a link 360, a link 365, a link 370, a link 375, and a link 380).

Additionally, or alternatively, some components of the system 300 may operate in an AON state, whereas other components may operate in a SON state. When the system 300 transitions power modes and components are initialized, the system 300 may analyze a received command using a component in an always on state (e.g., an AON state) such that the command may be processed after all (or most) of the components are initialized. By analyzing the command during this duration (e.g., the duration when one or more components are being initialized), the system 300 may reduce or mitigate latency that would otherwise be incurred by analyzing the command once the components are fully initialized. Accordingly, the overall performance of the system 300 may be improved.

In some cases, the components of the system 300 may be operable to receive and process a command from a host system. For example, the system 300 may receive a command from the host system via a host interface 320. In some examples, the commands may be received according to a Universal Flash Storage (UFS) protocol. Upon receiving the command, the command may be queued at the host interface 320 (e.g., the host interface 320 may include a queue) before being analyzed and processed by the power management unit 315, the front end CPU 325, or both. In other examples, the host interface 320 may directly transfer data (e.g., as part of a write command) to the buffer manager 305. As described herein, the depth of the queue of the host interface 320 may be set by the power management unit 315, the front end CPU 325, or both based on the power mode the system 300 is operating in and based on which components are initialized.

The power management unit 315, which may be an example of a memory system controller 215 as described with reference to FIG. 2, may communicate with the host interface 320, the direct memory access 310, the front end CPU 325, and the memory array 330. In some examples, the power management unit 315 may analyze commands received by the host interface 320, initialize components of the system 300, transmit signaling to the direct memory access 310 for the execution of commands, load code (e.g., firmware code) stored to the buffer manager 305, and the like.

The direct memory access 310 may receive signaling (e.g., instructions) from the power management unit 315, the front end CPU 325, or both and may execute operations at the buffer manager 305. For example, the direct memory access 310 may facilitate access operations performed on one or more memory cells of the buffer manager 305 when the system 300 is operating in a second power mode (e.g., a normal power mode, an on mode). In some examples, the power management unit 315 may perform one or more operations in parallel (e.g., concurrently) with the direct memory access 310 executing commands at the buffer manager 305. Moreover, when the system 300 transitions power modes (e.g., from a first power mode to a second power mode), the direct memory access 310 may load code (e.g., hiber code) from the buffer manager 305 to initialize the front end CPU 325.

The buffer manager 305 may be an example of one or more memory devices 240 as described with reference to FIG. 2. For example, the buffer manager 305 may include one or more memory cells, such as one or more non-volatile memory cells. The memory cells of the buffer manager 305 may be located on-chip (e.g., within the system 300) but may be external to the power management unit 315 (e.g., external to a controller of the system 300). In some examples, the buffer manager 305 may store user data (e.g., data written based on one or more commands received from a host system) and may also store code for initializing one or more components of the system 300.

As described herein, the host interface 320, the power management unit 315, the direct memory access 310, and the buffer manager 305 may be referred to as AON components. That is, the components may always (or mostly always) receive power from a voltage source (or other power source of the system 300) regardless of whether the system 300 is operating in a first power mode or a second power mode. For example, when the system 300 is operating in a first power mode (e.g., a low power mode, a hibernate mode, an off mode), the host interface 320, the power management unit 315, the direct memory access 310, and the buffer manager 305 may remain powered. Similarly, when the system 300 is operating in a second power mode (e.g., a normal power mode, an on mode), the components may remain powered.

Other components of the system 300 may be referred to as SON components. For example, the front end CPU 325 may be referred to as a SON component. The front end CPU 325 (e.g., a first processing element 325) may be an example of a standalone component or may represent a portion of firmware configured to perform various functions of the system 300. For example, when operating in the second power mode, the front end CPU 325 may receive commands from the host interface 320 and transmit signaling to the direct memory access 310 to process (e.g., execute) the commands. Additionally, or alternatively, the front end CPU 325 may include, be coupled with, or otherwise have access to a memory array 330 for storing commands and code.

The back end CPU 335 (e.g., a second processing element 335) may be an example of a standalone component or may represent a portion of firmware configured to perform various functions of the system 300. For example, when operating in the second power mode, the back end CPU 335 may communicate with the front end CPU 325 to execute commands received from the host interface 320 and to transmit signaling to the direct memory access 310 to process (e.g., execute) the commands.

As described herein, the front end CPU 325, the memory array 330, and the back end CPU 335 may be referred to as SON components. That is, the components may or may not receive power from a voltage source (or other power source of the system 300) and thus may occasionally be powered down (e.g., powered off) when the system 300 is operating in the first power mode. For example, when the system 300 is operating in a first power mode (e.g., a low power mode, a hibernate mode, an off mode), the front end CPU 325, the memory array 330, and the back end CPU 335 may be powered down (e.g., off). Accordingly, when the system 300 transitions to a second power mode, the front end CPU 325, the memory array 330, and the back end CPU 335 may be initialized.

In some examples, the system 300 may transition between power modes. For example, the system 300 may transition back and forth between a first power mode and a second power mode. When operating in the first power mode, the system 300 may be referred to as being off, in a low power mode, in a reduced power mode, in a hibernate mode, or any mode other than a normal operating mode. The SON may be powered down or powered off in the first power mode, whereas the AON components may be powered on in the first power mode. Additionally, or alternatively, when operating in the second power mode, the system 300 may be referred to as being on or operating in a normal mode. Both the AON and SON components may be powered on in the second power mode. In some examples, the system 300 may transition from the first power mode to the second power mode (or from the second power mode to the first power mode) based on receiving a command from a host system.

By way of example, the system 300 may be operating in a first power mode and may receive a command (e.g., from a host system) to transition to the second power mode. Upon receiving the command, the power management unit 315 may transmit signaling to the direct memory access 310 to load code stored to the buffer manager 305. The code, which may be referred to as a hiber code, may allow for the front end CPU 325 begin initializing. Accordingly, the direct memory access 310 may load the code to the front end CPU 325. In some instances, the code may be stored to the memory array 330.

Once the code is loaded, the host interface 320 may be initialized. In some instances, because the host interface 320 is an AON component, initializing the host interface 320 may include setting an initial depth of its queue. For example, a queue depth of the host interface 320 may be set to a first value (e.g., one). Accordingly, the host interface 320 may be configured to receive (e.g., queue) a quantity of commands less than or equal to the first value. After the queue depth is set, the front end CPU 325 may begin initializing (e.g., powering on, powering up).

In some examples, after the queue depth of the host interface 320 is set, a host system may transmit a command to the host interface 320. The command may be transmitted from the host system and received by the host interface 320 during a duration in which the front end CPU 325 is initializing. The command may be an access command (e.g., a read command, a write command), a start stop unit (SSU) command, or another type of command. The power management unit 315 may receive the command from the host interface 320 and may analyze the command. As described herein, analyzing the command may include determining a type of the command, determining one or more operational parameters for performing the command, or both.

While the power management unit 315 is analyzing the command, the front end CPU 325 may become fully initialized and the back end CPU 335 may begin an initialization sequence. In some instances, the command may be a SSU command. In such instances, the power management unit 315 may determine a type of the command (e.g., that the command is a SSU command) and may maintain the system 300 in the first power mode. In such instances, the system 300 may save power and latency that would otherwise be incurred due to powering the system 300 on before powering back down.

In instances where the command is not a SSU command, the power management unit 315 may store a result of the analysis to the memory array 330. In some examples, the power management unit 315 may store an indication of the type of command, the command itself, or both to the memory array 330. Additionally, or alternatively, the power management unit 315 may transmit signaling to the front end CPU 325 to indicate that the analysis is complete. That is, the power management unit 315 may indicate to the front end CPU 325 to anticipate the analysis being stored to the memory array 330. In some instances, while the power management unit 315 is analyzing the command and storing the resulting analysis (and, in some instances, the command itself) to the memory array 330, the back end CPU 335 may become fully initialized.

Once the SON components are initialized, the analyzed command may be performed (e.g., executed). Additionally, or alternatively, the queue depth may be set to a second value (e.g., a value greater than one) and the front end CPU 325 may begin processing commands received by the host interface 320. Accordingly, commands may be performed (e.g., executed) without the system 300 incurring additional latency that would have otherwise occurred by analyzing the command once the SON components are fully initialized.

Figure 4:
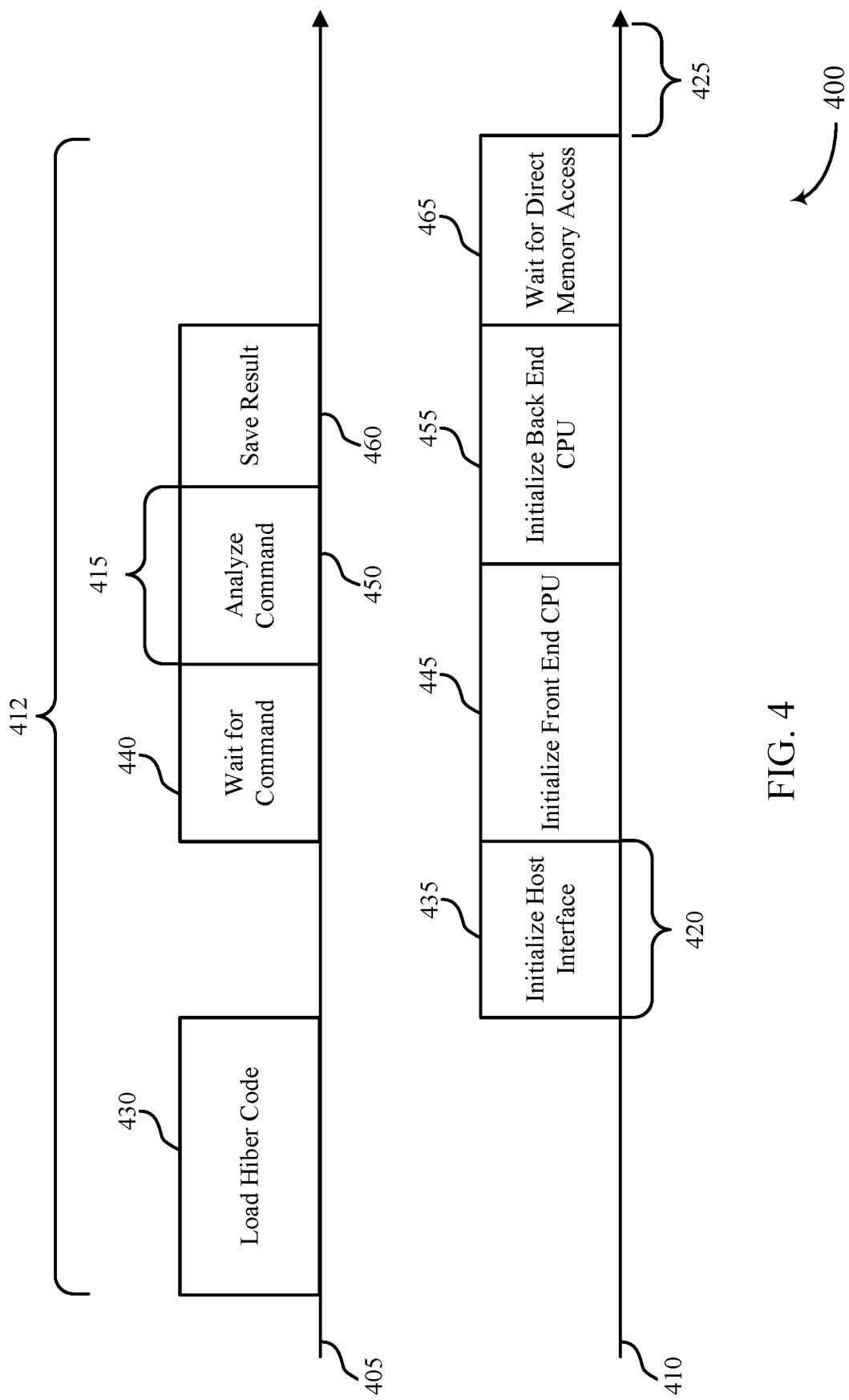
FIG. 4 illustrates an example of a timing diagram that supports command scheduling for a memory system in accordance with examples as disclosed herein.

FIG. 4 illustrates an example of a timing diagram 400 that supports command scheduling for a memory system in accordance with examples as disclosed herein. The timing diagram 400 may be implemented by aspects of the system 300 as described with reference to FIG. 3. For example, the timing diagram 400 may illustrate operations 405 performed by a power management unit 315 as described with reference to FIG. 3, as well as operations 410 performed by a front end CPU 325 as described with reference to FIG. 3. In some examples, the timing diagram 400 may illustrate operations that occur during a first duration 412, a second duration 415, a third duration 420, and a fourth duration 425. The timing diagram 400 may illustrate the initialization of the system 300, including analyzing a received command during the first duration 412. By analyzing the command during the first duration, the system 300 may reduce or mitigate latency that would otherwise be incurred by analyzing the command once the components are fully initialized. Accordingly, the overall performance of the system 300 may be improved.

In some instances, prior to 430, the system 300 may be operating in a first power mode. Accordingly, the system 300 may receive a command to transition from the first power mode to a second power mode. Upon receiving the command, the system 300 may begin transitioning power modes during the first duration 412.

At 430, a code (e.g., a hiber code) may be loaded. In some instances, the code may be loaded from the buffer manager 305 by the power management unit 315 and the direct memory access 310. As described herein, the code may be loaded to the front end CPU 325 (or the memory array 330) and may allow for the front end CPU 325 to analyze a command received at the host interface 320.

At 435, the host interface 320 may be initialized. In some instances, the host interface 320 may be initialized during a third duration 420, which may be a subset of the first duration 412 (e.g., the third duration 420 may occur during the first duration 412) and may occur after the code is loaded (e.g., at 430). As described herein, when initializing the host interface 320, a depth of its queue may be set to a first value. Accordingly, the host interface 320 may receive a quantity of commands that is less than or equal to the first value.

At 440, the power management unit 315 may wait for a command. In some instances, the power management unit 315 may wait for a command received by the host interface 320 (e.g., wait for a command queued at the host interface 320). The power management unit 315 may begin waiting for the command after the host interface 320 is initialized (e.g., at 435).

At 445, the front end CPU 325 may be initialized. In some examples, the front end CPU 325 may begin being initialized after the host interface 320 is initialized (e.g., at 435). Additionally, or alternatively, the front end CPU 325 may begin being initialized concurrent with the power management unit 315 waiting for a command. In other examples, the power management unit 315 may begin waiting for a command before the front end CPU 325 is initialized or vice versa.

At 450, a received command may be analyzed. That is, prior to 450 a command may be received and queued at the host interface 320. In some instances, the command may be analyzed during a second duration 415, which may be a subset of the first duration 412 (e.g., the second duration 415 may occur during the first duration 412) and may occur after the power management unit 315 waits for the command (e.g., at 440).

The power management unit 315 may analyze the command to determine a type of the command received. As described herein, the command may be an access command (e.g., a read command, a write command), a SSU command, or another type of command. The power management unit 315 may receive the command from the host interface 320 and may analyze the command to determine a type of the command, determine one or more operational parameters for performing the command, or both. In some instances, at least a portion of the analysis (e.g., at 450) may occur while the front end CPU 325 becomes fully initialized (e.g., at 445). In other examples (not shown), if the power management unit 315 determines that the command is a SSU command, the power management unit 315 may revert the system 300 back to a first power mode (and may thus revert all SON components back to the first power mode).

At 455, the back end CPU 335 may be initialized. In some examples, the back end CPU 335 may begin being initialized after the front end CPU 325 is initialized (e.g., at 445). Additionally, or alternatively, the back end CPU 335 may begin being initialized during a portion of the second duration 415 (e.g., while the power management unit 315 is analyzing the command).

At 460, the result(s) of the command analysis may be saved. As described herein, the power management unit 315 may store an indication of the type of command, the command itself, or both to the memory array 330. Additionally, or alternatively, the power management unit 315 may transmit signaling to the front end CPU 325 to indicate that the analysis is complete. By saving the results of the analysis to the memory array 330, the front end CPU 325 may be able to process (e.g., execute) the command after the SON components are initialized. Additionally, or alternatively, the back end CPU 335 may become fully initialized concurrent with the analysis being saved to the memory array 330. In other examples, the power management unit 315 may fully store the analysis to the memory array 330 before the back end CPU 335 is fully initialized or vice versa.

At 465, the system 300 may wait for the direct memory access 310. That is, the system 300 may wait for the direct memory access 310 to process the analyzed command. Accordingly, after the command is processed, the queue depth may be set to a second value and the front end CPU 325 may take control (e.g., retake control) of the host interface 320 from the power management unit 315. Accordingly, during a fourth duration 425, the host interface 320 may receive a quantity of commands less than or equal to the second value, and the received commands may be processed by the front end CPU 325. Accordingly, commands may be performed (e.g., executed) without the system 300 incurring additional latency that would have otherwise occurred by analyzing a command once the SON components are fully initialized.

Figure 5:
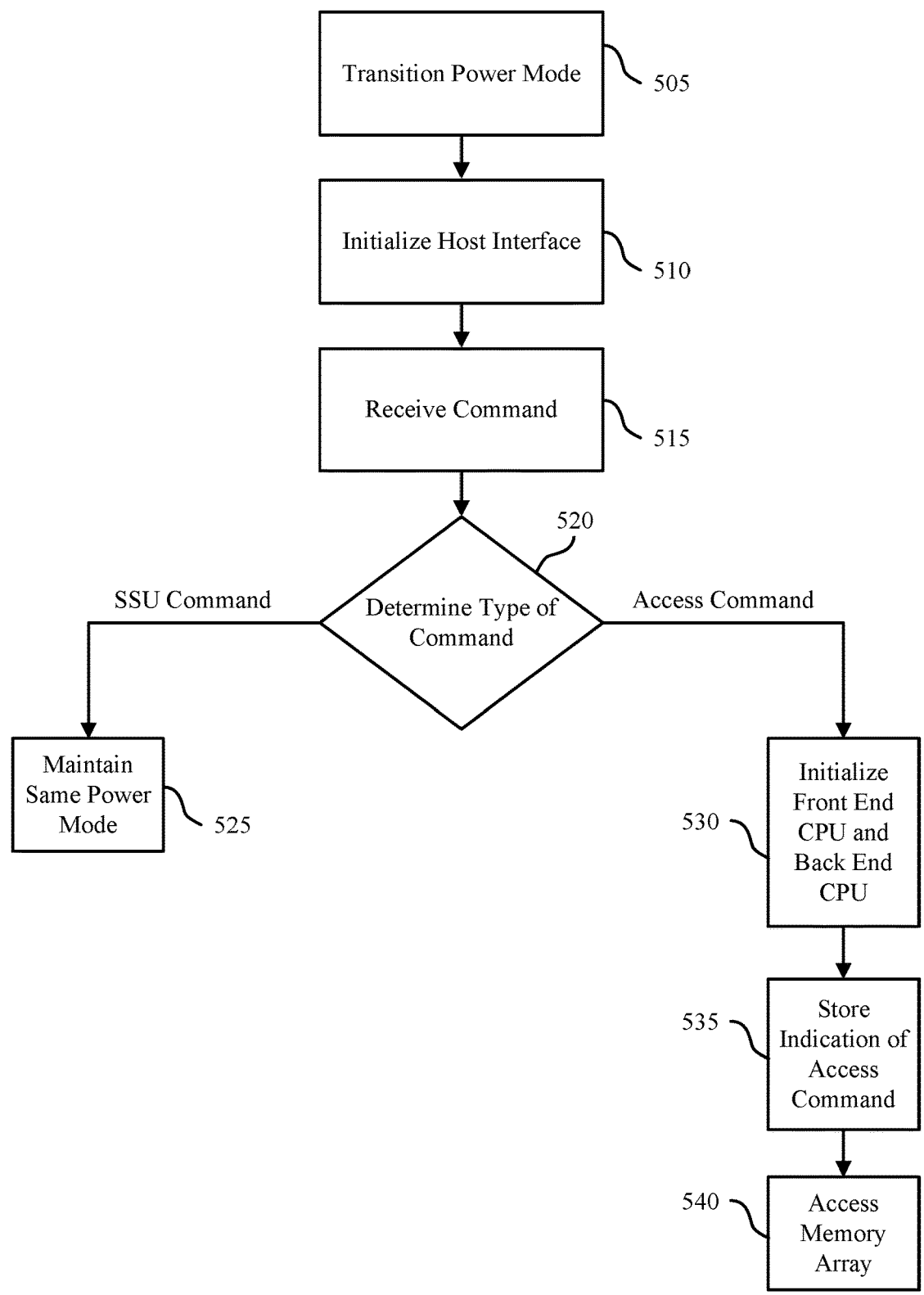
FIG. 5 illustrates an example of a process flow diagram that supports command scheduling for a memory system in accordance with examples as disclosed herein.

FIG. 5 illustrates an example of a process flow diagram 500 that supports command scheduling for a memory system in accordance with examples as disclosed herein. The operations of the process flow diagram 500 may be implemented by a system, such as the system 300 as described by FIG. 3. For example, one or more components of the system 300 may perform operations associated with the process flow diagram 500 to support receiving and analyzing a command at a first component (e.g., an AON component, such as the power management unit 315) and initializing one or more second components (e.g., an SOF component, such as the front end CPU 325). Alternative examples of the following may be implemented, where some steps are performed in a different order or not at all. Additionally, some steps may include additional features not mentioned below.

At 505, the system 300 may transition power modes. For example, the system may receive a command (e.g., from a host system) to transition from a first power mode (e.g., a lower power mode) to a second power mode (e.g., a higher power mode). In some cases, the command may be received by the host interface 320 and the power management unit 315 may initiate the transitioning of power modes. As part of transitioning power modes, the system 300 may power on (e.g., initialize) one or more SOF components.

At 510, the system 300 may initialize the host interface 320. When initializing the host interface 320, a depth of its queue may be set to a first value. Accordingly, the host interface 320 may receive a quantity of commands that is less than or equal to the first value.

At 515, the system 300 may receive a command at the host interface 320 after the host interface has been initialized. For example, the power management unit may receive the command from the host interface. As described herein, the command may be an access command, a SSU command, or another type of command.

At 520, the power management unit 315 may determine a type of the command received (e.g., the power management unit 315 may analyze the command). For example, the power management unit 315 may determine whether the command is a SSU command or an access command (or another type of command not described). As illustrated by FIG. 5, subsequent operations of the system 300 may be affected based on the type of the command.

At 525, the power management unit 315 may have determined the command to be a SSU command. In such instances, the system 300 may be maintained in the first power mode (e.g., a relatively low power mode). That is, at 525, that power management unit (or another component of the system 300) may cease initializing the SON components. In some cases, maintaining the system 300 in the first power mode may include powering down the one or more SOF components (e.g., components that have been initialized as part of transitioning power modes).

At 530, the power management unit 315 may have determined the command to be an access command. In such instances, the power management unit 315 may initialize the front end CPU 325 and the back end CPU 335 as described herein. As described herein, by initializing the front end CPU 325, the back end CPU 335, or both, the access command (e.g., the command received at 515) may be processed without additional latency that would be incurred due to analyzing the command once the SON components are fully initialized.

At 535, the power management unit 315 may store an indication of the analysis (e.g., the indication of the analysis of the access command) to the memory array 330. For example, the front end CPU 325, upon being initialized, may identify the stored analysis to support processing the access command.

At 540, the front end CPU 325 may process the access command (e.g., the command received at 515). As described herein, the front end CPU 325 may process the command by transmitting signaling to the direct memory access 310, which may access the buffer manager 305. Moreover, after processing the command, the queue depth of the host interface 320 may be set to a second value. Accordingly, during a subsequent duration (e.g., during a fourth duration), the host interface 320 may receive a quantity of commands less than or equal to the second value, and the received commands may be processed by the front end CPU 325. Accordingly, commands may be performed (e.g., executed) without the system 300 incurring additional latency that would have otherwise occurred by analyzing a command once the SON components are fully initialized.

Figure 6:
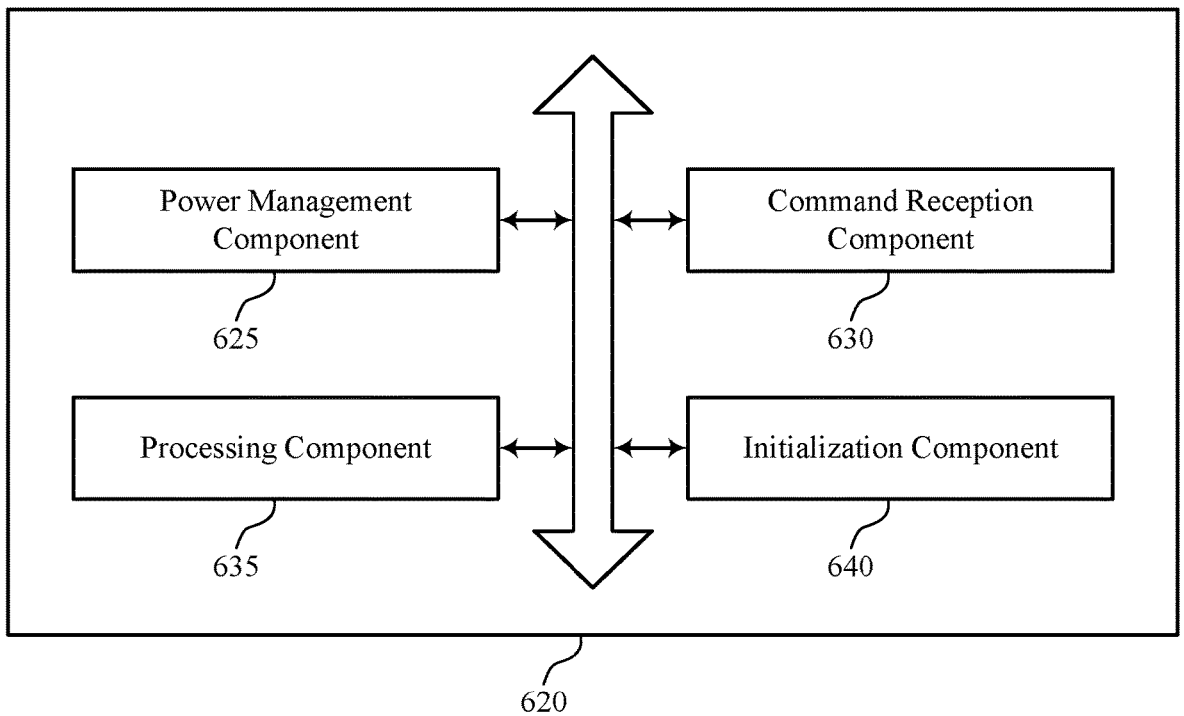
FIG. 6 shows a block diagram of a memory system that supports command scheduling for a memory system in accordance with examples as disclosed herein.

FIG. 6 shows a block diagram 600 of a memory system 620 that supports command scheduling for a memory system in accordance with examples as disclosed herein. The memory system 620 may be an example of aspects of a memory system as described with reference to FIGS. 1 through 5. The memory system 620, or various components thereof, may be an example of means for performing various aspects of command scheduling for a memory system as described herein. For example, the memory system 620 may include a power management component 625, a command reception component 630, a processing component 635, an initialization component 640, or any combination thereof. Each of these components may communicate, directly or indirectly, with one another (e.g., via one or more buses).

The power management component 625 may be configured as or otherwise support a means for transitioning, by a memory system during a first duration, from a first power mode to a second power mode, where the memory system includes at least a first processing element and a second processing element. The command reception component 630 may be configured as or otherwise support a means for analyzing, based at least in part on transitioning from the first power mode to the second power mode and during a second duration, a command received, where the first processing element and the second processing element are initialized during the second duration. The processing component 635 may be configured as or otherwise support a means for processing the command based at least in part on analyzing the command and initializing the first processing element and the second processing element during the second duration.

In some examples, to support analyzing the command during the second duration, the command reception component 630 may be configured as or otherwise support a means for determining a type of the command received during the second duration, where the command is processed according to the type.

In some examples, to support processing the command, the processing component 635 may be configured as or otherwise support a means for storing, by the memory system, an indication of the access command to a first memory array associated with the first processing element. In some examples, to support processing the command, the processing component 635 may be configured as or otherwise support a means for accessing a second memory array of the memory system based at least in part on storing the indication of the access command to the first memory array.

In some examples, to support processing the command, the power management component 625 may be configured as or otherwise support a means for maintaining the memory system in the first power mode.

In some examples, the initialization component 640 may be configured as or otherwise support a means for initializing, by the memory system during a third duration prior to the second duration, an interface coupled with a host system, where receiving the command is based at least in part on initializing the interface.

In some examples, the initialization component 640 may be configured as or otherwise support a means for setting a depth of a queue associated with the interface to a first value based at least in part on initializing the interface during the third duration.

In some examples, the initialization component 640 may be configured as or otherwise support a means for setting a depth of a queue associated with the interface to a second value based at least in part on initializing the first processing element, where the second value is greater than a first value.

In some examples, the first duration includes at least the second duration.

In some examples, to support transitioning from the first power mode to the second power mode, the command reception component 630 may be configured as or otherwise support a means for receiving, by the memory system prior to the first duration, a second command to transition the memory system from the first power mode to the second power mode.

In some examples, the initialization component 640 may be configured as or otherwise support a means for initializing, during the second duration, the first processing element and the second processing element based at least in part on receiving the second command to transition the memory system from the first power mode to the second power mode. In some examples, the command reception component 630 may be configured as or otherwise support a means for receiving, by at least the first processing element during a fourth duration, a plurality of commands via an interface coupled with a host system based at least in part on the first processing element being initialized.

Figure 7:
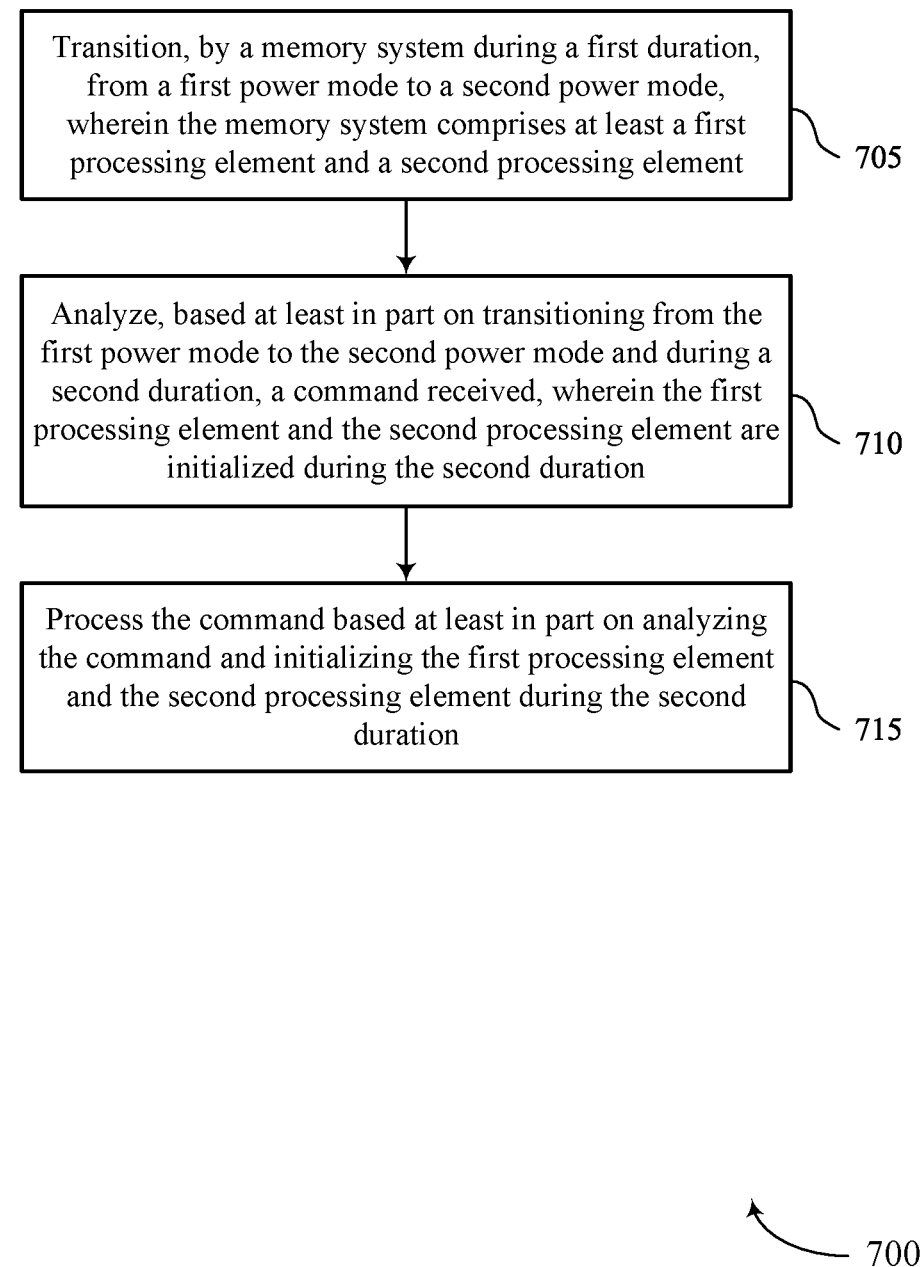
FIG. 7 shows a flowchart illustrating a method or methods that support command scheduling for a memory system in accordance with examples as disclosed herein.

FIG. 7 shows a flowchart illustrating a method 700 that supports command scheduling for a memory system in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include transitioning, by a memory system during a first duration, from a first power mode to a second power mode, where the memory system includes at least a first processing element and a second processing element. The operations of 705 may be performed in accordance with examples as disclosed herein. In some examples, aspects of the operations of 705 may be performed by a power management component 625 as described with reference to FIG. 6.

At 710, the method may include analyzing, based at least in part on transitioning from the first power mode to the second power mode and during a second duration, a command received, where the first processing element and the second processing element are initialized during the second duration. The operations of 710 may be performed in accordance with examples as disclosed herein. In some examples, aspects of the operations of 710 may be performed by a command reception component 630 as described with reference to FIG. 6.

At 715, the method may include processing the command based at least in part on analyzing the command and initializing the first processing element and the second processing element during the second duration. The operations of 715 may be performed in accordance with examples as disclosed herein. In some examples, aspects of the operations of 715 may be performed by a processing component 635 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for transitioning, by a memory system during a first duration, from a first power mode to a second power mode, where the memory system includes at least a first processing element and a second processing element; analyzing, based at least in part on transitioning from the first power mode to the second power mode and during a second duration, a command received, where the first processing element and the second processing element are initialized during the second duration; and processing the command based at least in part on analyzing the command and initializing the first processing element and the second processing element during the second duration.

Aspect 2: The method, apparatus, or non-transitory computer-readable medium of aspect 1, where analyzing the command during the second duration includes operations, features, circuitry, logic, means, or instructions, or any combination thereof for determining a type of the command received during the second duration, where the command is processed according to the type.

Aspect 3: The method, apparatus, or non-transitory computer-readable medium of aspect 2, where processing the command includes operations, features, circuitry, logic, means, or instructions, or any combination thereof for storing, by the memory system, an indication of the access command to a first memory array associated with the first processing element and accessing a second memory array of the memory system based at least in part on storing the indication of the access command to the first memory array.

Aspect 4: The method, apparatus, or non-transitory computer-readable medium of any of aspects 2 through 3, where processing the command includes operations, features, circuitry, logic, means, or instructions, or any combination thereof for maintaining the memory system in the first power mode.

Aspect 5: The method, apparatus, or non-transitory computer-readable medium of any of aspects 1 through 4, further including operations, features, circuitry, logic, means, or instructions, or any combination thereof for initializing, by the memory system during a third duration prior to the second duration, an interface coupled with a host system, where receiving the command is based at least in part on initializing the interface.

Aspect 6: The method, apparatus, or non-transitory computer-readable medium of aspect 5, further including operations, features, circuitry, logic, means, or instructions, or any combination thereof for setting a depth of a queue associated with the interface to a first value based at least in part on initializing the interface during the third duration.

Aspect 7: The method, apparatus, or non-transitory computer-readable medium of any of aspects 5 through 6, further including operations, features, circuitry, logic, means, or instructions, or any combination thereof for setting a depth of a queue associated with the interface to a second value based at least in part on initializing the first processing element, where the second value is greater than a first value.

Aspect 8: The method, apparatus, or non-transitory computer-readable medium of any of aspects 1 through 7, where the first duration includes at least the second duration.

Aspect 9: The method, apparatus, or non-transitory computer-readable medium of any of aspects 1 through 8, where transitioning from the first power mode to the second power mode further includes operations, features, circuitry, logic, means, or instructions, or any combination thereof for receiving, by the memory system prior to the first duration, a second command to transition the memory system from the first power mode to the second power mode.

Aspect 10: The method, apparatus, or non-transitory computer-readable medium of aspect 9, further including operations, features, circuitry, logic, means, or instructions, or any combination thereof for initializing, during the second duration, the first processing element and the second processing element based at least in part on receiving the second command to transition the memory system from the first power mode to the second power mode and receiving, by at least the first processing element during a fourth duration, a plurality of commands via an interface coupled with a host system based at least in part on the first processing element being initialized.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   transitioning, by a memory system during a first duration, from a first power mode to a second power mode, wherein the memory system comprises at least a first processing element and a second processing element;
   analyzing, based at least in part on transitioning from the first power mode to the second power mode and during a second duration, a command received;
   initializing, during the second duration, the first processing element, wherein the first processing element is fully initialized at least partially concurrent with analyzing the command;
   determining a type of the command based at least in part on analyzing the command;
   determining whether to begin initialization of the second processing element after initializing the first processing element based at least in part on determining the type of the command; and
   processing the command based at least in part on determining the type of the command, initializing the first processing element, and determining to begin the initialization of the second processing element after initializing the first processing element.

2. The method of claim 1, wherein the type of the command comprises an access command, wherein processing the command comprises:
   storing, by the memory system, an indication of the access command to a first memory array associated with the first processing element; and
   accessing a second memory array of the memory system based at least in part on storing the indication of the access command to the first memory array.

3. The method of claim 1, wherein the type of the command indicates, to the memory system, to remain in the first power mode, wherein processing the command comprises:
   maintaining the memory system in the first power mode based at least in part on the type of the command being a start-stop unit command.

4. The method of claim 1, further comprising:
   initializing, by the memory system during a third duration prior to the second duration, an interface coupled with a host system, wherein receiving the command is based at least in part on initializing the interface.

5. The method of claim 4, further comprising:
   setting a depth of a queue associated with the interface to a first value based at least in part on initializing the interface during the third duration.

6. The method of claim 4, further comprising:
   setting a depth of a queue associated with the interface to a second value based at least in part on initializing the first processing element, wherein the second value is greater than a first value.

7. A non-transitory computer-readable medium storing code comprising instructions which, when executed by one or more processors of an electronic device, cause the electronic device to:
   transition, during a first duration, from a first power mode to a second power mode, wherein the electronic device comprises at least a first processing element and a second processing element;
   analyze, based at least in part on transitioning from the first power mode to the second power mode and during a second duration, a command received;
   initialize, during the second duration, the first processing element, wherein the first processing element is fully initialized at least partially concurrent with analyzing the command;
   determine a type of the command based at least in part on analyzing the command;
   determine whether to begin initialization of the second processing element after initializing the first processing element based at least in part on determining the type of the command; and
   process the command based at least in part on determining the type of the command, initializing the first processing element, and determining to begin the initialization of the second processing element after initializing the first processing element.

8. The non-transitory computer-readable medium of claim 7, wherein the type of the command comprises an access command, and wherein to process the command, the instructions, when executed by the one or more processors of the electronic device, further cause the electronic device to:
   store an indication of the access command to a first memory array associated with the first processing element; and
   access a second memory array of the electronic device based at least in part on storing the indication of the access command to the first memory array.

9. The non-transitory computer-readable medium of claim 7, wherein to process the command, the instructions, when executed by the one or more processors of the electronic device, further cause the electronic device to:
   maintain the electronic device in the first power mode based at least in part on the type of the command being a start-stop unit command.

10. The non-transitory computer-readable medium of claim 7, wherein the instructions, when executed by the one or more processors of the electronic device, further cause the electronic device to:
  initialize, during a third duration prior to the second duration, an interface coupled with a host system, wherein receiving the command is based at least in part on initializing the interface.

11. The non-transitory computer-readable medium of claim 10, wherein the instructions, when executed by the one or more processors of the electronic device, further cause the electronic device to:
  set a depth of a queue associated with the interface to a first value based at least in part on initializing the interface during the third duration.

12. The non-transitory computer-readable medium of claim 10, wherein the instructions, when executed by the one or more processors of the electronic device, further cause the electronic device to:
  set a depth of a queue associated with the interface to a second value based at least in part on initializing the first processing element, wherein the second value is greater than a first value.

13. The non-transitory computer-readable medium of claim 7, wherein the first duration comprises at least the second duration.

14. The non-transitory computer-readable medium of claim 7, wherein the instructions, when executed by the one or more processors of the electronic device, further cause the electronic device to:
  receive, prior to the first duration, a second command to transition the electronic device from the first power mode to the second power mode;
  initialize, during the second duration, the first processing element based at least in part on receiving the second command to transition the electronic device from the first power mode to the second power mode; and
  receive, during a fourth duration, a plurality of commands via an interface coupled with a host system based at least in part on the first processing element being initialized.

15. A memory system, comprising:
  one or more memory devices; and
  processing circuitry coupled with the one or more memory devices and configured to cause the memory system to:
    transition, during a first duration, from a first power mode to a second power mode, wherein the memory system comprises at least a first processing element and a second processing element;
    analyze, based at least in part on transitioning from the first power mode to the second power mode and during a second duration, a command received;
    initialize, during the second duration, the first processing element, wherein the first processing element is fully initialized at least partially concurrent with analyzing the command;
    determine a type of the command based at least in part on analyzing the command;
    determine whether to begin initialization of the second processing element after initializing the first processing element based at least in part on determining the type of the command; and
    process the command based at least in part on determining the type of the command, initializing the first processing element, and determining to begin the initialization of the second processing element after initializing the first processing element.

16. The memory system of claim 15, wherein the type of the command comprises an access command, and wherein, to process the command, the processing circuitry is configured to cause the memory system to:
  store an indication of the access command to a first memory array associated with the first processing element; and
  access a second memory array of the memory system based at least in part on storing the indication of the access command to the first memory array.

17. The memory system of claim 15, wherein, to process the command, the processing circuitry is configured to cause the memory system to:
  maintain the memory system in the first power mode based at least in part on the type of the command being a start-stop unit command.

18. The memory system of claim 15, wherein the processing circuitry is further configured to cause the memory system to:
  initialize, during a third duration prior to the second duration, an interface coupled with a host system, wherein receiving the command is based at least in part on initializing the interface.

19. The memory system of claim 18, wherein the processing circuitry is further configured to cause the memory system to:
  set a depth of a queue associated with the interface to a first value based at least in part on initializing the interface during the third duration.

20. The memory system of claim 18, wherein the processing circuitry is further configured to cause the memory system to:
  set a depth of a queue associated with the interface to a second value based at least in part on initializing the first processing element, wherein the second value is greater than a first value.

21. The memory system of claim 15, wherein the first duration comprises at least the second duration.

22. The memory system of claim 15, wherein the processing circuitry is further configured to cause the memory system to:
  receive, prior to the first duration, a second command to transition the memory system from the first power mode to the second power mode;
  initialize, during the second duration, the first processing element based at least in part on receiving the second command to transition the memory system from the first power mode to the second power mode; and
  receive, during a fourth duration, a plurality of commands via an interface coupled with a host system based at least in part on the first processing element being initialized.

* * * * *